United States Patent [19]
Cram et al.

[11] Patent Number: 5,631,562
[45] Date of Patent: May 20, 1997

[54] TIME DOMAIN ELECTROMAGNETIC WELL LOGGING SENSOR INCLUDING ARCUATE MICROWAVE STRIP LINES

[75] Inventors: Milton E. Cram, Houston, Tex.; Thomas A. Janes, Tampa, Fla.

[73] Assignee: Western Atlas International, Inc., Houston, Tex.

[21] Appl. No.: 533,188

[22] Filed: Sep. 25, 1995

Related U.S. Application Data

[63] Continuation of Ser. No. 220,972, Mar. 31, 1994, abandoned.

[51] Int. Cl.$^6$ .............................. G01V 3/12; G01R 27/02
[52] U.S. Cl. .............................. 324/333; 324/642
[58] Field of Search .............................. 324/323, 347, 324/332–338, 639, 642, 632, 633, 643

[56] References Cited

U.S. PATENT DOCUMENTS

| | | | |
|---|---|---|---|
| 3,660,754 | 5/1972 | Tsao et al. | 324/333 |
| 3,828,245 | 8/1974 | Unterberger | 324/337 |
| 4,300,098 | 11/1981 | Huchital et al. | 324/338 |
| 4,511,842 | 4/1985 | Moran et al. | 324/338 |
| 4,529,938 | 7/1985 | Hagiwara | 324/339 |
| 4,626,773 | 12/1986 | Kroeger et al. | 324/376 X |
| 4,866,371 | 9/1989 | De | 324/347 X |
| 4,996,489 | 2/1991 | Sinclair | 324/639 |
| 5,132,623 | 7/1992 | De et al. | 324/639 X |
| 5,136,249 | 8/1992 | White et al. | 324/642 X |

*Primary Examiner*—Sandra L. O'Shea
*Assistant Examiner*—Roger C. Phillips
*Attorney, Agent, or Firm*—Darryl M. Springs

[57] ABSTRACT

An electromagnetic well logging tool for imaging the electrical characteristics of a borehole. A tool inserted into the borehole includes the appropriate mechanical apparatus to align a plurality of transmission lines adjacent to the borehole wall without requiring direct electrical contact. Electrical circuitry applies a step or impulse voltage on one end and samples the reflections at the same end of each transmission line, where the reflections indicate the magnitude of any changes of dielectric constant of the material of the borehole wall. The transmission lines are preferably angled relative to the center line of the borehole for a complete mapping of the circumference. The tool is moved at a desired speed through the portion of the borehole where measurement is desired. The sampling rate of the reflections depends on the desired speed of the tool and the desired resolution of the measurements.

22 Claims, 7 Drawing Sheets

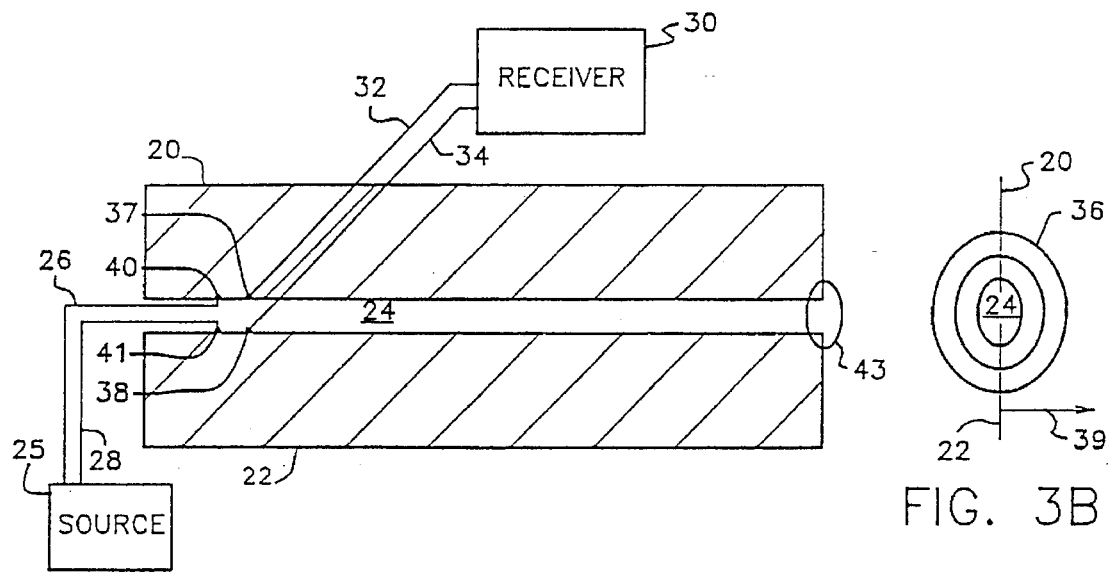
FIG. 3A
FIG. 3B
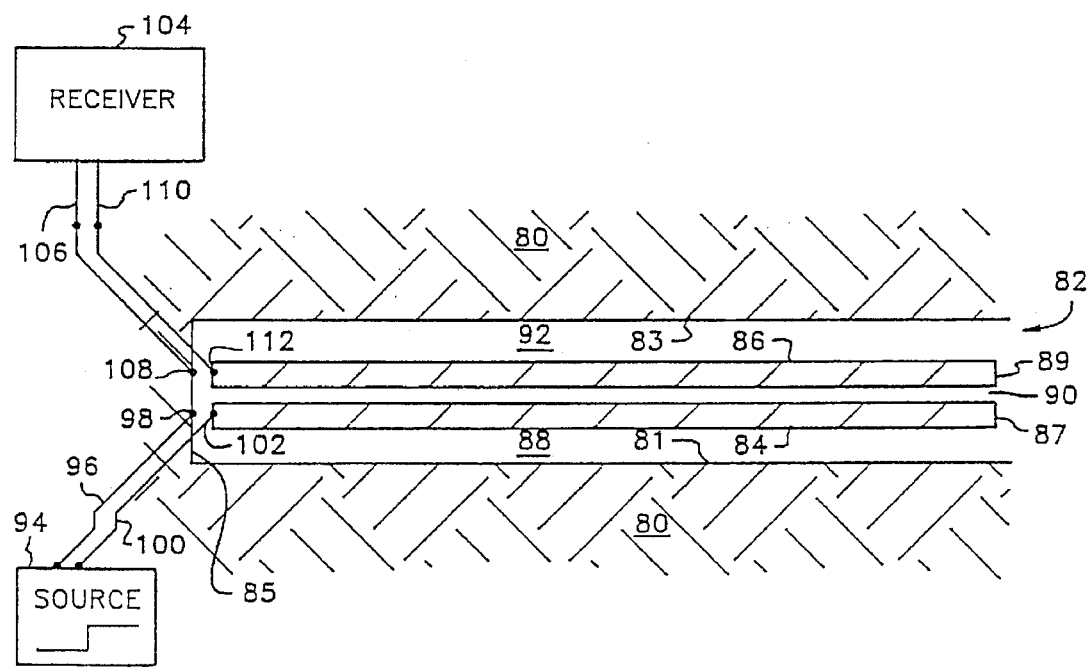
FIG. 10

TIME DOMAIN ELECTROMAGNETIC WELL LOGGING SENSOR INCLUDING ARCUATE MICROWAVE STRIP LINES

This is a continuation of application Ser. No. 08/220,972 filed Mar. 31, 1994, now abandoned.

FIELD OF THE INVENTION

The present invention relates to an electromagnetic borehole imaging system for determining the electrical characteristics of the materials along a borehole wall.

BACKGROUND OF THE INVENTION

The primary goal of most borehole measuring systems is to determine the amount, location and producibility of hydrocarbon materials in a borehole. Hydrocarbons include oil, gas or both. There are many characteristics of the rock of the borehole wall which may be measured to determine hydrocarbon presence and producibility. These characteristics typically include rock texture and permeability, bulk density, electrical conductivity and bulk resistivity, just to name a few. These measurements are used to determine the amount and type of fluid in the rock. All of these measurable parameters are interdependent upon each other, so that it is desirable to measure as many of them as possible for a determination of hydrocarbon amount, type and producibility.

One example is neutron logging tools, which determine the bulk density and effective porosity of the rock. Another example is imaging devices, such as the formation microimager, which determines the microscopic variations in electrical conductivity. The microimager uses a contact method, where pads are physically pressed against the borehole wall for a direct electrical measurement of conductivity. Acoustic type devices are also known for mapping out the shape or diameter of the borehole wall, and for determining rock porosity.

Another important characteristic of the formation is its dielectric constant or electrical permittivity, which indicates the amount of electrostatic energy that can be stored in the material when a given voltage or electrical field is applied. The dielectric constant or permittivity of a material, referred to by the symbol $\epsilon$, is defined as $\epsilon=\epsilon_r\epsilon_0$ where $\epsilon_0$ is the permittivity of free space equal to $8.85\times10^{-12}$ farads/meter (Inks units) and $\epsilon_r$ is referred to as relative permittivity. Examples of relative permittivities for particular materials is 1 for freespace and for gas, 2 for oil, between 4–10 for rock and about 80 for water. The dielectric constant for water is relatively independent of its salinity, whereas the conductivity of water varies considerably with salinity. Thus, the dielectric constant is a very important parameter for a determination of the hydrocarbons as distinguished from the quantity of water in the rock material. This is true, since the difference in conductivity of an oil-based mud versus a low salinity water-based mud is relatively small, whereas the difference of the dielectric constant is very pronounced.

Therefore, it is desirable to measure the dielectric constant of the rock and other materials of the formation in a borehole. This measurement can be used alone or may be combined with other measurements for a determination of the amount and producibility of hydrocarbon material in the rock of a borehole wall.

SUMMARY OF THE INVENTION

A time domain reflectometer according to the present invention uses one or more transmission lines aligned next to, without requiring electrical contact, the borehole wall, where an impulse or step voltage input is applied to one end of each transmission line and the voltage response on the transmission line is measured over time. The transmission line is implemented and located so that an electromagnetic field developed on the transmission line by the initial input voltage interacts with the formation, causing reflections which modify the voltage response over time. The characteristic impedance of the transmission line is a function of the dielectric constant and conductivity of the formation. The effect of conductivity changes is generally much smaller than those due to dielectric changes at high frequencies. Each reflection indicates the location of a change of dielectric constant of the material of the formation, and the magnitude of the reflection indicates the relative dielectric constant at the discontinuity.

The transmission line is preferably in the form of a non-conductive slot formed by two parallel conductors, where the slot spreads the electric field to allow greater interaction with the borehole wall. The spread of the electric field may be varied depending upon the resolution desired or the amount of formation to be measured at any time. A greater resolution is achieved with a smaller spread of the electromagnetic field, since a smaller portion of the formation is measured. The desired resolution may be hampered by the thickness of any mud caked on the borehole wall. If mud cake is present, the spread of the electrical field is made greater or the formation tool is equipped to scrape the mud off prior to taking measurements. Thus, it is desirable that the transmission line be placed in close proximity to the formation material of the borehole wall, although direct contact is not required.

In the preferred embodiment, a plurality of transmission line measuring devices are mounted on a logging tool, which is moved along a part or over the entire length of the borehole to measure any desired portion of the formation. Preferably, the transmission lines are aligned at an angle with respect to the center axis of the borehole and overlap each other in the direction of the center axis to provide a complete mapping of the entire circumferential surface of the borehole wall. A computer is used to retrieve and evaluate the data for distinguishing any overlap and to achieve an accurate mapping of the formation.

In this manner, a time domain reflectometer according to the present invention measures variations in the dielectric constant of the materials along the formation. This data may be used alone, but is typically combined with other information to determine the amount, type and producibility of hydrocarbons in the formation.

BRIEF DESCRIPTION OF THE DRAWINGS

A better understanding of the present invention can be obtained when the following detailed description of the preferred embodiment is considered in conjunction with the following drawings, in which:

FIG. 3A shows a slot transmission line test apparatus used to test the principles of operation of a time domain reflectometer according to the present invention;

FIG. 3B is an end review of the test apparatus of FIG. 3A including lines illustrating an electromagnetic field;

FIG. 10 is an alternative transmission line test apparatus for testing the principles of operation of a time domain reflectometer according to the present invention;

DETAILED DESCRIPTION OF PREFERRED EMBODIMENT

Figure 1:
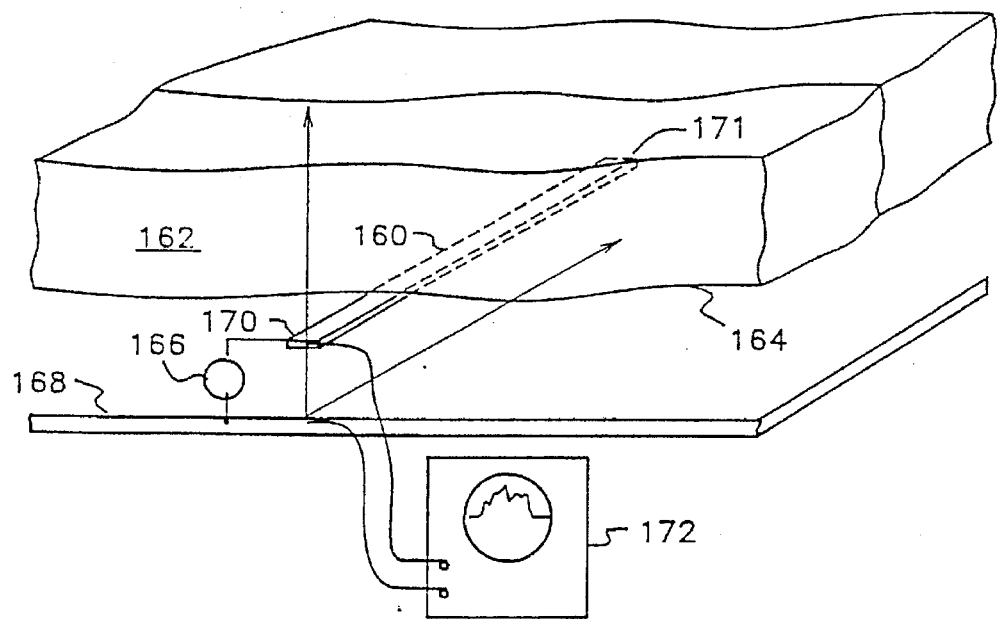
FIG. 1 is a perspective view of one implementation of a time domain reflectometer apparatus according to the present invention for use in making measurements in a borehole.

Referring now to FIG. 1, a time domain reflectometer apparatus according to the present invention for use in a borehole is shown. A transmission line 160 is oriented parallel to and displaced slightly from a surface 164 of the borehole or formation 162. A voltage generator 166 is coupled between a metal backing plate 168 and to a first end 170 of the transmission line 160. A monitor 172 is coupled between the backing plate 168 and the transmission line 160 at the first end 170 of the transmission line 160. Appropriate termination circuitry (not shown) matched to the initial or original characteristic impedance ($Z_O$) of the transmission line 160 is preferably coupled to its opposite end 171. It is noted that the end 171 of the transmission line 160 need not be terminated at all and could be left open-circuited or shorted.

In general, the generator 166 applies an impulse or step voltage on the transmission line 160 and the monitor 172 measures the voltage versus time at the sending end 170. The voltage measured by the monitor 172 is the sum of the input voltage applied by the generator 166 and any reflections occurring on the transmission line 160. Time variations in the reflected signal correspond to the changes in the impedance of the transmission line 160. If the transmission line 160 were located in "freespace" or away from the formation 162, the monitor 172 would preferably measure the impulse or step applied by the generator 166 and any reflections caused by the transmission line 160 alone. There should be little or no reflections caused by the transmission line 160 alone if a matched termination is provided at the end 171.

The transmission line 160 is fashioned so that when it is placed adjacent the formation 162 as shown in FIG. 1, a portion of the electromagnetic field (E-field) generated by the impulse or step voltage applied by the generator 166 is coupled to the formation 162. Assuming sufficient energy or strength of the applied E-field is coupled into the formation 162 surrounding the borehole, time variations appearing on the monitor 172 are strongly dependent upon the constitutive parameters, such as the dielectric constant of the formation and variations thereof. Thus, the characteristic impedance $Z_0$ of the transmission line 160 changes and becomes a function of the complex dielectric constant at the formation 162. Any changes in the impedance along the transmission line 160 due to changes of dielectric constant in the formation 162 cause additional reflections to occur at the sending end 170, which are measured by the monitor 172.

The voltage reflection coefficient Γ of a transmission line is given by the following equation 1:

$$\Gamma = \frac{Z_L - Z_O}{Z_L + Z_O}$$

where $Z_L$ is the load impedance of the transmission line and $Z_O$ is its characteristic impedance. A load impedance $Z_L$ is not physically applied along the transmission line. Instead, the transmission line is placed adjacent a formation, so that the formation modifies its characteristic impedance. For purposes of simplicity of the present disclosure, the initial impedance of the transmission line is referred to as its characteristic impedance $Z_0$, and any changes in the original characteristic impedance will be referred to as the load impedance $Z_L$. Assuming proper termination or an infinite transmission line, if the impedances are matched, $Z_O=Z_L$ and the reflection coefficient Γ is zero, so that no reflections occur. However, if there is an open circuit along the transmission line, $Z_L=\infty$ and the reflection coefficient Γ is 1, so that the entire asserted impulse or step is transferred back to the source, doubling the initial voltage level. If there is a short circuit along the transmission line, $Z_L=0$ and the reflection coefficient is −1, so that the entire asserted impulse or step is reflected back to the source. However, the reflected voltage has the opposite sign as that of the source voltage, so that zero voltage results.

It is also known that impedance Z, assuming negligible conduction currents, is defined by equation 2:

$$Z = \sqrt{\frac{\mu}{\epsilon}}$$

where the magnetic permeability μ is equal to $4\pi \times 10^{-7}$ henry/meter (h/m) in freespace and the dielectric constant $\epsilon = \epsilon_0 \epsilon_r$. The velocity V of an electromagnetic wave traveling along a transmission line is defined by the following equation 3:

$$V = \frac{1}{\sqrt{\mu\epsilon}}$$

The above equations may be readily modified to account for conduction currents if such currents are not negligible, such as, for example, high salinity formations. From the equations provided above, the change of the relative permittivity $\epsilon_r$ of a material in the formation 162 may be measured from the discontinuities or reflections of the measured response. The delay of the reflection indicates the location and the amplitude of the reflection indicates the magnitude of the change of the dielectric constant ε of the material, with the sign of the change indicating a decrease or increase.

Figure 2:
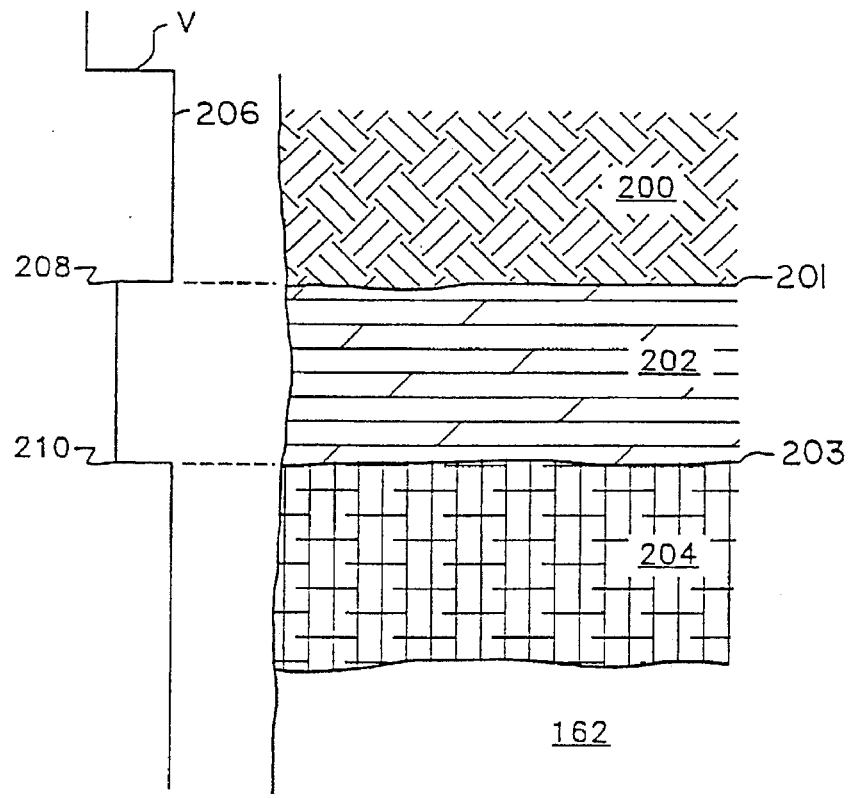
FIG. 2 shows a cross-sectional side view of a formation and a corresponding expected ideal output waveform from a time domain reflectometer apparatus according to the present invention used to measure the formation.

For example, FIG. 2 shows a cross-sectional side view the formation 162, and an expected ideal output waveform 206 measured by the monitor 172 aligned with the formation 162. The formation 162 comprises a first layer 200 having a low relative permittivity $\epsilon_r$, which is on top of a second layer 202 comprising a material having a high relative permittivity $\epsilon_r$. The second layer 202 is on top of a third layer 204 having a low relative permittivity $\epsilon_r$. The layers 200, 202 are separated by a junction 201 and the layers 202, 204 are separated by a junction 203. As shown by the waveform 206, a change from low to high dielectric constant at the junction 201 causes a negative going reflection or step 208, and a change from high to low dielectric constant at the junction 203 causes a positive going reflection or step 210. The time delays between the initial applied input voltage and the steps 208 and 210 indicate the relative location of the junctions 201 and 203, respectively. The magnitudes of the steps 208, 210 indicate the relative change in the dielectric constants of the corresponding layers 200 to 202, and 202 to 203, respectively, along the borehole wall 164.

Referring now to FIG. 3A, a slot transmission line test apparatus used to test the principles of operation of a time domain reflectometer according to the present invention is shown. The slot transmission line apparatus of FIG. 3A includes a first conducting plate 20 aligned next to a second conducting plate 22, forming a non-conducting gap or transmission slot 24 between the conducting plates 20, 22. A source apparatus 25 is electrically connected to the conducting plates 20, 22 through conductive connections 26, 28 at connection points 40, 41, respectively, along the transmission slot 24. A receiver 30 is shown electrically connected to the conducting plates 20, 22 through electrical connections 32 and 34 at connection points 37, 38, respectively along the transmission slot 24. It is noted that the connection points 37, 38 are in close proximity to the source connection points 40, 41 relative to the length of the transmission slot 24. In operation, the source 25 applies an impulse or step function voltage between the conducting plates 20, 22, which travels along the transmission slot 24, and the receiver 30 measures the response near the applied voltage at the connection points 37, 38.

The opposite ends 43 of the conductive plates 20, 22 may be open-circuited, short circuited or terminated in one of several ways. It is preferred that the conductive plates 20, 22 each be terminated by a load impedance having the same impedance as the characteristic impedance $Z_0$ of the transmission line formed by the conductive plates 20, 22 and the surrounding medium, although this is not required. Matched terminations at the ends 43 prevent reflections from the ends 43. The important parameter is the differential between measured reflections before and after samples are placed to interfere with the characteristic impedances of the conducting plates 20, 22 along the transmission slot 24, so that any common reflections are subtracted out.

FIG. 3B is a cross-sectional end view of the apparatus of FIG. 3A, illustrating the alignment of the conducting plates 20, 22 forming the non-conducting transmission slot 24. An electromagnetic field (E-field) is illustrated by field lines 36 developed between the conducting plates 20, 22. The E-field 36 is developed by the impulse or step voltage asserted by the source 25 on the conducting plates 20, 22. An arrow 39 indicates the direction of increasing standoff distance, where items placed directly on the conduction plates 20, 22 are at zero standoff. Thus, items placed on or above the conducting plates 20, 22 and across the transmission slot 24 generally interfere with the E-field 36. This interference correspondingly alters the characteristic impedance of the transmission slot 24. It is noted that the size of the slot 24 and the magnitude of the applied voltage determine the strength and amount of spreading of the E-field 36. A more confined E-field 36 detects a smaller area, but increases resolution of the measurements. A spatially expanded E-field 36 can detect a greater area, at a cost of resolution.

Equation 3 indicates that the velocity V of the traveling wave along the transmission slot 24 is modified with changes in permittivity $\epsilon$. Several methods could be used to calculate the average velocity for more accurate results. One or more electrical taps can be placed along the transmission slot 24 for monitoring when the initial asserted impulse or step applied by the source 25 reaches each electrical tap. Each tap would include the appropriate sensor, detection, amplification and comparator circuitry to detect the initial asserted impulse or step. The displacement from the connection points 40, 41 of each electrical tap is known, so that velocity of the wave can readily be determined. Alternatively, the ends 43 can be shorted or open circuited to provide a large reflection, which is detected by the receiver 30. The length of the transmission slot 24 divided by half the round trip time of the applied voltage would provide the average velocity of the electromagnetic wave.

FIGS. 4–9 are graphs of time varying voltage responses measured by the receiver 30 of FIG. 3A as displayed on an oscilloscope. The oscilloscope is preferably a high speed digital scope or a digital sampling scope. Thus, each trace on the graph comprises a plurality of sampling points of the voltage responses. In each graph, the voltage is displayed on the vertical axis at 30 millivolts per division (mV/div), and elapsed time is displayed along the horizontal axis using a time base of 400 picoseconds per division (ps/div).

An impulse voltage having a duration of approximately 400 ps was applied by the source 25, and the response measured by the receiver 30 is shown after a delay of approximately 80,886 nanoseconds (ns). In each graph of FIGS. 4–9, a first trace 50 shows the results measured by the receiver 30 due to application of the impulse in "freespace", that is, without any interfering sample placed along or near the transmission slot 24. A second trace illustrates the effect on the measured reflections after a sample is placed on or above the transmission slot 24, causing interference of the E-field 36. The elapsed time corresponds to the distance along the transmission slot 24. In each case, a large initial pulse 48 is the measurement of the applied impulse voltage.

Figure 4:
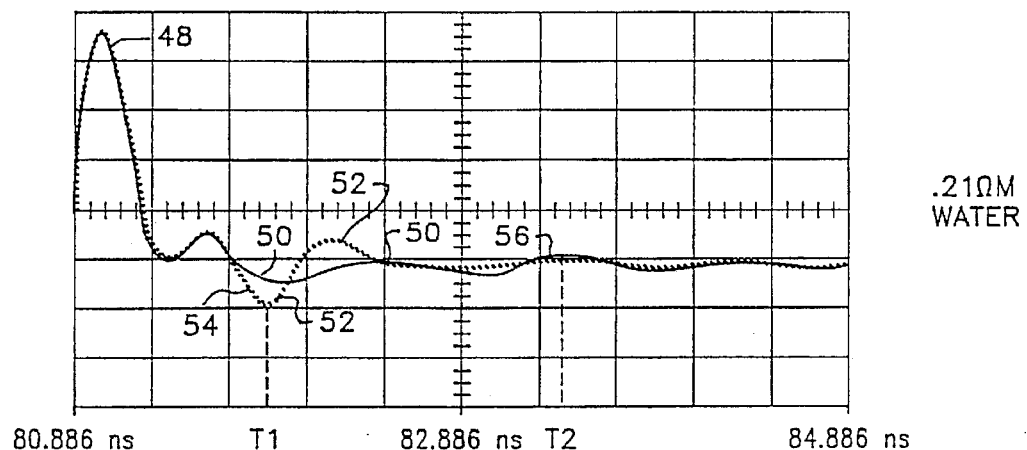
FIGS. 4–9 are graphs illustrating the results of experiments using the slot transmission line apparatus of FIG. 3A.

In FIG. 4, a water sample (not shown) is placed at zero standoff along the transmission slot 24. The water sample is contained in a plastic container having a width of 5 inches, a length of 5 inches and a height of 3 inches. The container holds water having a resistivity of 0.21 ohm-meters ($\Omega$-m). A second trace 52, super-imposed upon the trace 50, illustrates the response measured by the receiver 30 when the water sample of 0.21 $\Omega$-m is placed on the transmission slot 24. The negative pulse 54 occurring at a time T1, or approximately 81.9 ns, represents the leading edge of the water sample. The small positive amplitude pulse 56 at a time T2, or approximately 83.4 ns, illustrates the positive reflection as the voltage wave emerges from the water sample.

Figure 5:
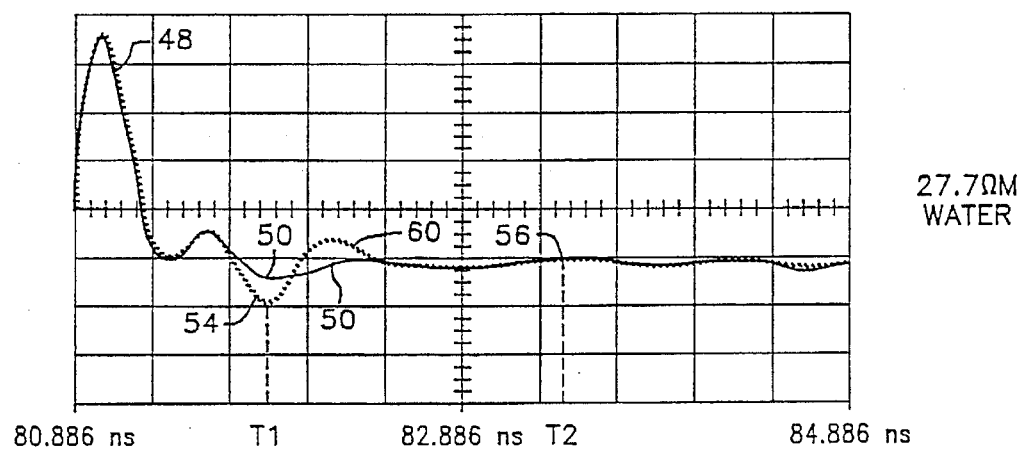

FIG. 5 shows a graph similar to that of FIG. 4, except using a water sample having a resistivity of 27.7 $\Omega$-m. The response measured by the receiver 30 when the water sample of 27.7 $\Omega$-m is placed on the transmission slot 24 at a standoff of zero inches is illustrated by a trace 60. The negative peak 54 at time T1 is almost identical with that shown in FIG. 4. However, the positive peak 56 at time T2 is not as pronounced. This is the opposite of that which was expected, where the attenuation of the 0.21 $\Omega$-m water was expected to be greater than the 27.7 $\Omega$-m water, but in any event, there is a difference and because the results shown in FIGS. 2 and 3 are repeatable, this change can be used as the measurement basis.

Figure 6:
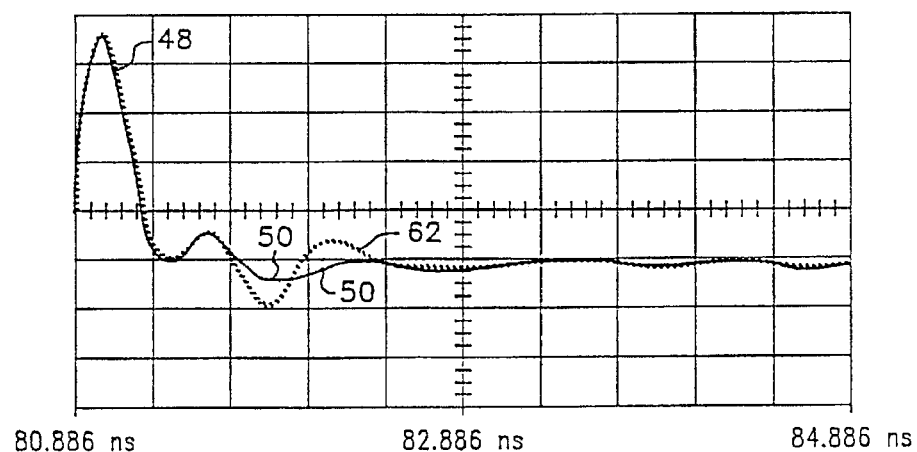
Figure 7:
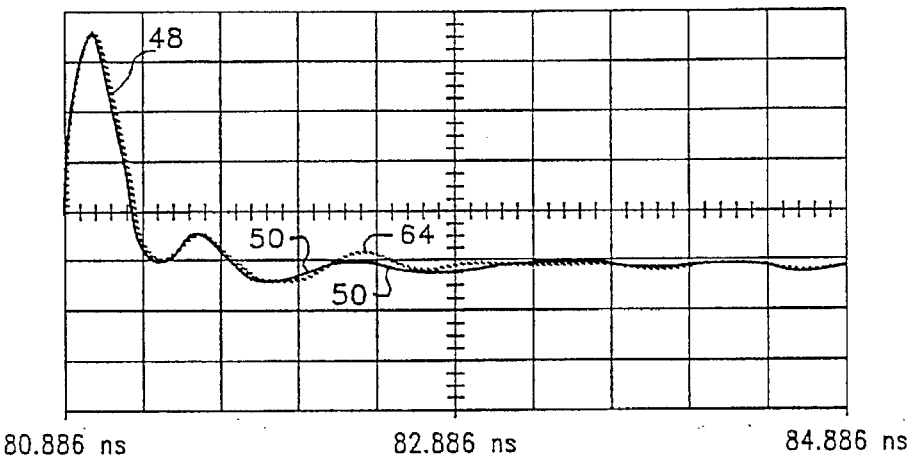

FIGS. 6 and 7 are graphs illustrating the results of the apparatus of FIG. 3A using a one-inch wide metal ruler (not shown) as a sample placed above the transmission slot 24. In FIG. 6, the metal ruler was placed at a standoff of ¼ inch, resulting in a trace 62. In FIG. 7, the same metal ruler is placed at a standoff of 1 7/8 inches, resulting in a trace 64. Note that the increase in standoff causes a reduced differential response, since the ruler has less affect on the E-field 36 at greater standoff.

Figure 8:
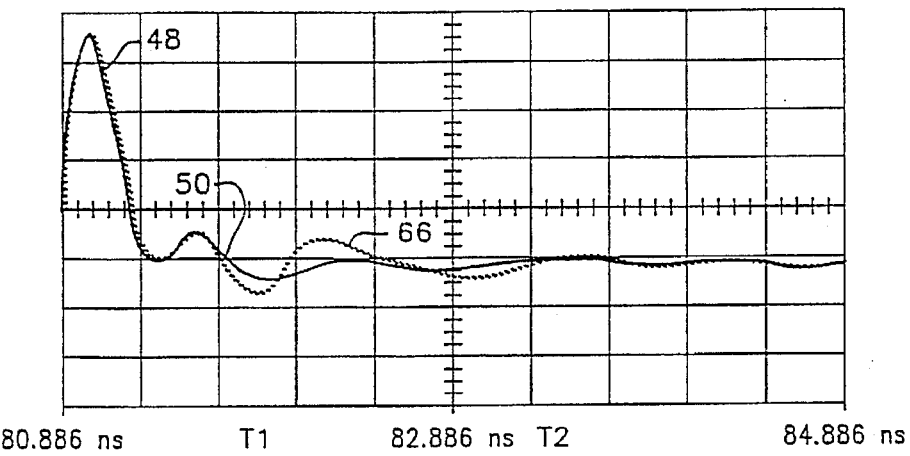
Figure 9:
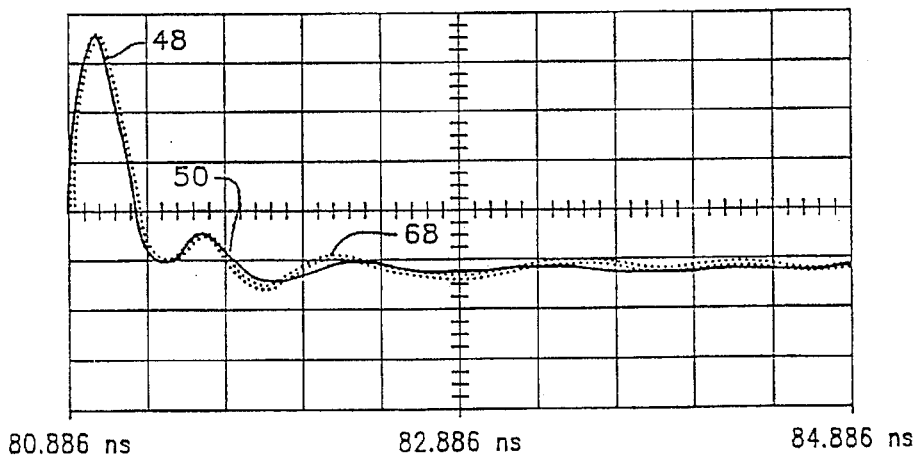

FIGS. 8 and 9 show the results of the apparatus used in FIG. 3A with a #2 lead pencil (not shown) as a sample. In FIG. 8, the pencil was placed at a standoff of zero inches resulting in a trace 66, and in FIG. 9, the pencil was placed at a standoff of ¼ inches resulting in a trace 68. Again, a greater standoff causes a smaller differential response. It is seen from FIGS. 4–9 that coupling of the E-field 36 occurs causing measurable results. An apparatus can be used to display the differential response between the two waveforms in each graph, and the results analyzed to calculate the dielectric constant of the sample. However, it is desired to eliminate the oscillations caused by the impulse 48.

Referring now to FIG. 10, an alternative transmission line apparatus for testing the principles of a time domain reflectometer apparatus according to the present invention is shown. A conductive base 80 is formed on one side of a printed circuit board (PCB), including a relatively wide, rectangular-shaped, non-conductive slot 82. A first thin conductive strip, referred to as the main line 84, is provided on the PCB within the slot 82 and aligned next to one side edge 81 of the slot 82. The main line 84 does not contact the base 80, so that a gap between the main line 84 and the edge side 81 forms a non-conductive slot 88. A second conductive strip, similar to the main line 84 and referred to as the coupled line 86, is also located in the slot 82 aligned parallel with the main line 84 forming a non-conductive slot 90 between them. The coupled line 86 is also aligned next to, but not contacting, another side edge 83 of the slot 82 in the base 80, to form another non-conductive slot 92. Again, the width of the slots 88, 90 and 92 and the magnitude of the applied voltage determine the strength and spreading of the generated E-field. This impacts the resolution of the measurements.

A source unit 94 is connected to the base 80 along an end 85 of the slot 82 at a connection point 98 through a conductor 96. The source 94 is coupled to the main line 84 at one end at a connection point 102 through a conductor 100. The connection point 98 is located along the end 85 preferably at a point closest to the connection point 102 across a gap. The source 94 can be the HP 5412IT time domain reflectometer (TDR) system manufactured by Hewlett Packard. The source unit 94 also preferably includes receiver circuitry to measure the reflections of a step voltage asserted onto the main line 84 between the connection points 98, 102 by the source unit 94.

A receiver 104 is connected to the base 80 along the edge 85 at a connection point 108 through a conductor 106. The receiver 104 is also connected to one end of the coupled line 86 at a connection point 112 through a conductor 110. In operation, the source 94 asserts a step voltage along the main line 84 and a response is measured by the receiver in the source 94 along the main line 84 and also by the receiver 104 along the coupled line 86. Opposite ends 87, 89 of the main and coupled lines 84, 86, respectively, are preferably terminated as described above. However, termination is desired but not absolutely necessary since the differential between the responses with and without samples is relatively unaffected.

Figure 11:
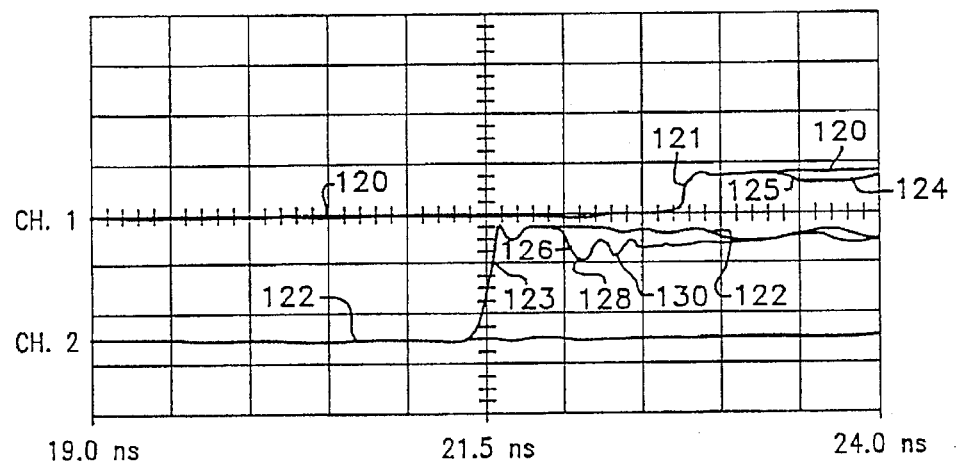
FIGS. 11–13 are graphs illustrating the results of experiments using the slot transmission line apparatus of FIG. 10.
Figure 12:
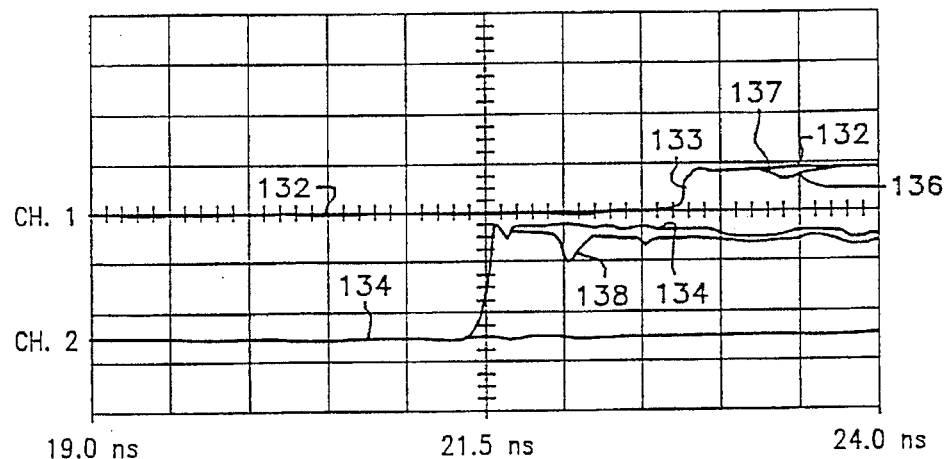
Figure 13:
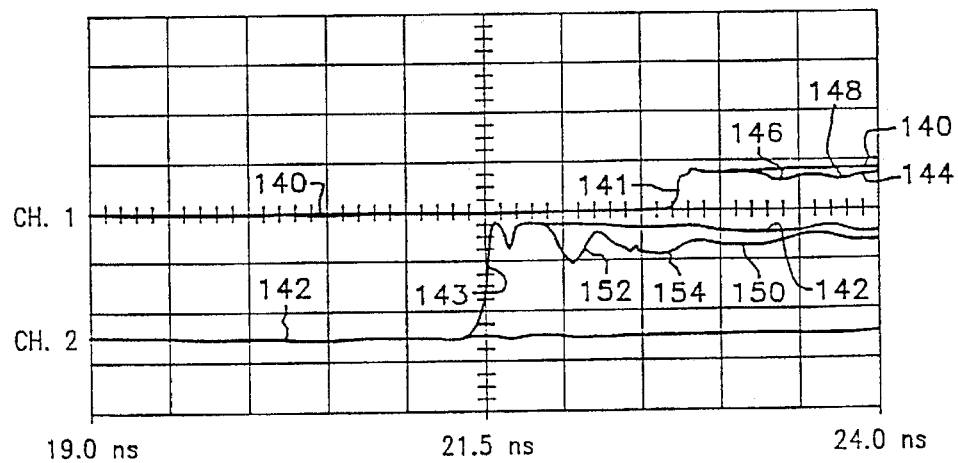

FIGS. 11–13 are graphs of time varying voltage responses of the apparatus shown in FIG. 10 by the source 94 and the receiver 104 as displayed on an oscilloscope. Again, the oscilloscope is preferably a high speed digital scope or a digital sampling scope, so that each trace comprises a plurality of sampling points of the voltage responses. For each graph, time is plotted along the horizontal axis with a time base of 500 ps/div beginning after a delay of approximately 19 ns. Voltage, measured in mV, is plotted along the vertical axis. Two separate channels are plotted, a first channel Ch.1 and a second channel Ch.2, where Ch.1 corresponds to the response measured by the source 94 along the main line 84 and Ch.2 corresponds to the response measured by the receiver 104 along the coupled line 86. Ch.1 is plotted at 80 mV/div and Ch.2 is plotted at 20 mV/div.

The amplitude of an input step voltage applied to the main line 84 in each case is approximately 260 millivolts. A step voltage is preferred over an impulse because of reduced oscillations. The step voltage is applied at an initial time and remains asserted throughout the duration of each test. A delay of approximately 19 ns occurs before any measurements are graphed. The two channels are misaligned in time by approximately 1 ns due to differences in cable links between the two lines and variances of the measurement system. For each graph of FIGS. 11–13, a first trace shows the reflections measured in freespace, and a second trace illustrates the effect of an interfering sample.

In FIG. 11, a trace 120 on Ch.1 and a trace 122 on Ch.2 illustrates the reflections or response received without any disturbance or sample applied along the main and coupled lines 84, 86. A second trace 124 on Ch.1 and a second trace 126 on Ch.2 illustrate the reflections from two human fingers placed side-by-side on the main and coupled lines 84, 86. Note that the traces 120 and 124 on Ch.1 essentially track each other for the most part and include a step 121 beginning at about 22.7 ns. The step 121 reaches its full height after about 50–100 ps. Similarly, the traces 122 and 126 on Ch.2 also track each other and have a corresponding step 123. The trace 124 illustrates a smeared response 125 beginning at approximately 23.4 ns and ending at approximately 24 ns. Two clear reflections occur on the coupled line 86, a first 128 centered at approximately 22.1 ns, and a second 130 centered at approximately 22.3 ns.

In FIG. 12, a first trace 132, 134 on channels Ch.1 and Ch.2, respectively, resulted without a sample and a second trace 136, 138 resulted with a sample of a single human finger placed along the main and coupled lines 84, 86. Note steps 133 on Ch.1 and 135 on Ch.2, which are similar to the steps 121, 123 of FIG. 11. The reflection 137 is centered at approximately 23.4 ns and the reflection 139 is centered at approximately 22.1 ns. It is noted that reflections 137 and 139 and channels Ch.1 and Ch.2, respectively, each show a thinner, singular response with only one finger, as compared to the two finger sample of FIG. 11. Also, the first reflection 128 of FIG. 11 is very similar to the reflection 139 of FIG. 12.

In FIG. 13, a trace 140 and a trace 142 are shown for Ch.1 and Ch.2, respectively, before any interfering sample is placed along the main and coupled lines 84, 86. Again, steps 141 and 143 in FIG. 13 are similar to the steps 133, 135 of FIG. 12 and 121, 123 of FIG. 11. A second trace 144 occurs on Ch.1 when the two human fingers are separated by 1 inch center-to-center and placed along the main and coupled lines 84, 86. The trace 144 includes a first reflection 146 centered at approximately 23.4 ns and a second reflection 148 centered at approximately 23.8 ns. Similarly, a second trace 150 resulted on Ch.2 with the two finger sample, where trace 150 includes a first reflection 152 centered at approximately 22.05 ns and a second reflection 154 beginning at approximately 22.2 ns. and ending at approximately 22.8 ns. Clearly, the reflections 146 and 152 of FIG. 13 correspond to the reflections 137 and 139, respectively, of FIG. 12. Also, the reflection 154 of FIG. 13 corresponds to the reflection 130 of FIG. 11, illustrating that the response of the second finger is more pronounced when the fingers are separated. This is also evident when the reflections 146, 148 of FIG. 13 are compared to the smeared response 125 of FIG. 11, where the graph of FIG. 13 more clearly reveals the separate fingers.

In FIGS. 11–13, the reflections shown on the main line 84 have an amplitude of approximately 24 mV. Since the applied voltage is 260 mV, the measured reflection coefficient r on the main line 84 is $24/260=0.092$. Since the response on the coupled line 86 for the initial input step is 45 mV and amplitude of the reflections are approximately 12 mV, the apparent reflection coefficient F on the coupled line 86 is $12/45=0.266$. The reason for the enhancement on the coupled line 86 is not completely known. It could be due to the better frequency performance of the cables for the coupled line 86 or the frequency selection coupling occurring between the main and coupled lines 84, 86.

It is now desired to apply the principles described above to a well-logging tool for use in a borehole. It is noted that an apparatus according to the present invention primarily measures the permittivity or dielectric constant $\epsilon$ of the borehole material, which determines the amount of electric field energy that can be stored in the material. If the materials are highly conductive, the permittivity would consequently be very small, and other measuring techniques might be more effective. Also, magnetic materials are generally not expected in the borehole. With reference to equations 2 and 3 above, magnetic materials would modify the magnetic permeability $\mu$, which would affect the measurements. Therefore, highly conductive or magnetic portions of the borehole would yield inconclusive results.

Figure 14:
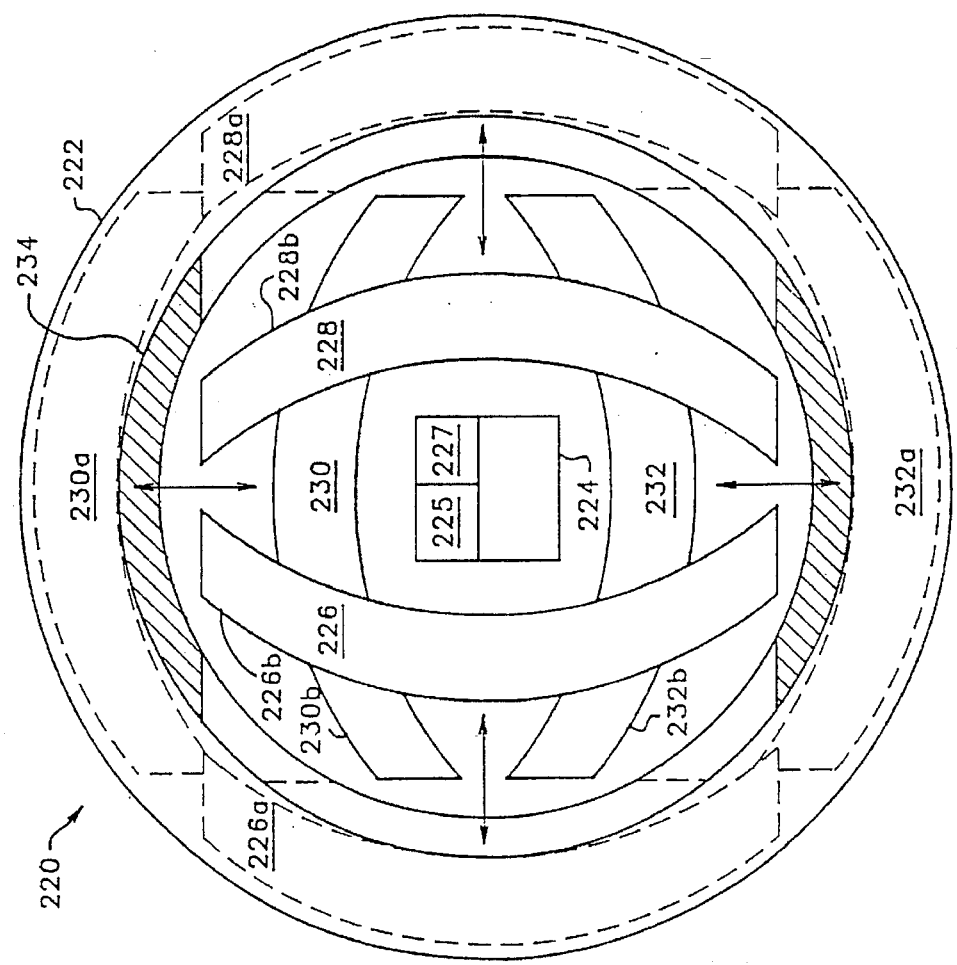
FIG. 14 is a cross-sectional top view of a time domain reflectometer logging tool for making reflectometer measurements in a borehole.

Referring now to FIG. 14, a cross-sectional top view of a formation evaluation tool 220 is shown surrounded by a borehole wall 222. The tool 220 includes a tool support apparatus 224 for mounting four pads 226, 228, 230 and 232 shown in the retracted position and protected by a shroud 234. The pads 226, 228, 230 and 232 have corresponding curved or rounded outer faces 226b, 228b, 230b and 232b, where each pad covers an arcuate portion of the circumference of the borehole wall 222. When placed inside the borehole, the pads 226, 228, 230 and 232 are extended by the tool support 224 to extended positions 226a, 228a, 230a and 232a, respectively, to align next to the borehole wall 222 without contact. The respective outer faces 226b, 228b, 230b and 232b of the pads 226, 228, 230 and 232 are each mounted with a plurality of transmission lines (not shown), so that when in the extended positions 226a, 228a, 230a and 232a, the transmission lines are aligned next to the borehole wall 222. Although only four pads are shown, more pads may be used, where the pads are preferably vertically staggered in pairs to cover the entire circumference of the borehole wall 222.

The tool support 224 would include the necessary mechanical apparatus for extending the pads 226, 228, 230 and 232 to the extended positions 226a, 228a, 230a and 232a, and also includes electrical circuitry 225 coupled to the plurality of transmission lines to apply the impulse or step voltages and to measure or sample the reflected responses. Furthermore, electrical taps can be provided along each transmission line for determination of the average velocity of the applied voltage as described previously. The electrical circuitry 225 preferably includes memory 227 for sampling and storing the reflections for later analysis as will the data for determining the average velocity. The tool 220 can be mounted on a drill collar as part of a drill string to implement measurement while drilling (MWD). Typically, however, the tool 220 would be part of a wireline device, such as a sonde, which is lowered into the borehole after drilling operations are interrupted and the drill string removed.

A computer can be included within the tool 220 for calculating the dielectric constant of the material along the borehole. The memory 227 would be a convenient place to store values from measurements taken in freespace for comparison with the borehole measurements to determine the differential. Of course, any known storage apparatues may be used. Alternatively, the measured values are transmitted to the surface, where a computer and memory on the surface store and analyze the measured data.

The tool support 224 may also include other desired apparatus, such as a scraper to scrape off any mud caked on the borehole wall 222 prior to making measurements. Alternatively, the spreading of the applied E-field on each transmission line could be increased to measure past or behind the mud cake. This would be at the cost of resolution, however.

Figure 15:
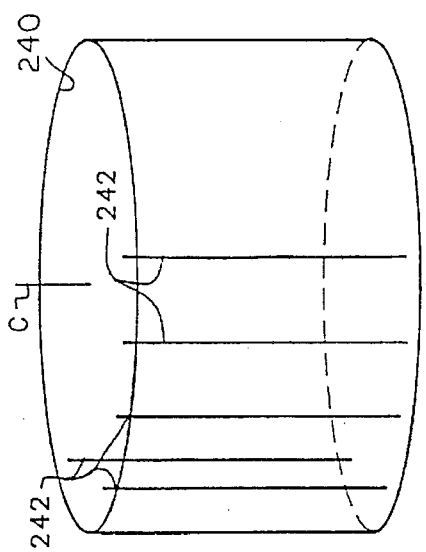
FIG. 15 illustrates one possible arrangement of transmission lines for making time domain reflectometer measurements in a borehole.

FIG. 15 shows a plurality of transmission lines 242 aligned vertically along a borehole wall 240. The plurality of transmission lines 242 are appropriately distributed around the entire circumference of the borehole wall 240. The associated mechanical and electrical apparatus is not shown for purposes of simplicity. The transmission lines 242 do not extend the entire length of the borehole, but would be mounted on a tool, such as the tool 220 shown in FIG. 15, where each of the transmission lines 242 is several inches in length. For each transmission line 242, a voltage source and receiver is electrically coupled to one end, and the other end is shorted, open-circuited or terminated as desired. Electrical taps can be provided along each transmission line 242 as desired for determination average velocity of the applied electromagnetic wave. Therefore, the entire length of the borehole wall 240 within the borehole could be measured by moving the tool 220 along a center axis C of the borehole. The problem with vertical orientation of the transmission lines 242 as shown in FIG. 15 is that the gaps between each would not be measured as the tool traverses the borehole. The tool could be rotated as it traverses the borehole, but this could unduly complicate the apparatus.

Figure 16:
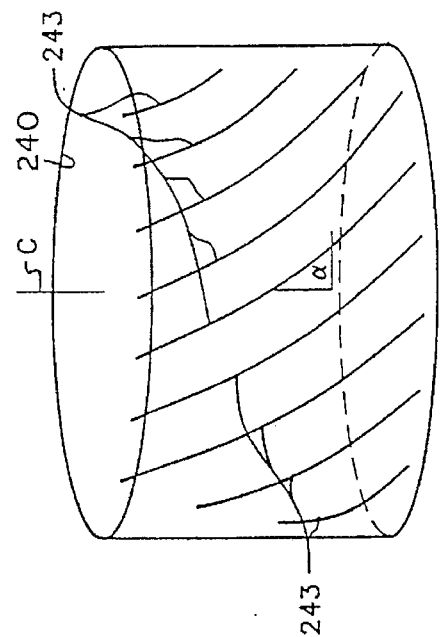
FIG. 16 illustrates an angular arrangement of transmission lines used for making time domain reflectometer measurements according to the present invention in a borehole.

FIG. 16 illustrates an alternative arrangement of the transmission lines 243 within the borehole wall 240. In particular, the transmission lines 243 are mounted at an angle $\alpha$ with respect to the center axis C to facilitate sensing of variations in planes that are parallel to the center axis C. Again, only the transmission lines 243 are shown for simplicity. In this manner, when a tool, such as the tool 220, includes a plurality of transmission lines 243 mounted at the angle $\alpha$ is moved along the center axis C of the borehole, the entire surface of the borehole wall 240 may be measured.

It is preferred that an arcuate portion of the circumference of the borehole wall covered by each transmission line 243 overlaps that arcuate portion covered by each of its adjacent transmission lines 243 throughout the entire circumference for complete mapping. The tool could otherwise be rotated while traversing the borehole for complete coverage, but this could unduly complicate the mechanical structure and possibly complicate the electronics. Any angle from 0–90 degrees could be used, where horizontal transmission lines would be at a 90 degree angle relative to the center axis C, and the vertical transmission lines 242 shown in FIG. 15 are at an angle of 0 degrees. The desired angle $\alpha$ would depend on the number and length of the transmission lines 243.

Overlapping measurements of the same points along the borehole wall 240 occur with angled or vertical transmission lines, but a computer, such as the computer 227, may be used to easily resolve the repetitive measurements.

The spatial resolution of the measurement system is a function of the rise time of the applied voltage step. A sharp interface continues to give a reflection over the rise time interval, so that a true representation is not provided of the layered samples of the formation having a thickness less than the velocity of the applied step voltage waveform times its rise time. If the relative permittivity $\epsilon_r$ of the measuring system is 4 and the rise time of the applied step voltage is about 50 ps, the uncorrected vertical resolution $\Delta L$ of the system is determined by the following equation 4:

$$\Delta L = \frac{C_o}{\sqrt{\epsilon_r}} \times 50\, ps \cong 0.3 \text{ inches}$$

where $C_o$ is the velocity of light in free space ($3\times10^8$ meters/sec or $1.18\times10^{10}$ inches/sec). The vertical resolution $\Delta L$ due to change in the position of the tool within the borehole is determined by the following equation 5:

$$\Delta L = \frac{\text{tool speed}}{\text{sample rate } (T_S)}$$

where $T_s$ is the sample rate that the tool must achieve to reach the desired vertical resolution $\Delta L$. The sample rate $T_s$ is the number of times the applied impulse or step is applied, referred to as the number of repetitions or sweeps per second.

If it is desired to keep $\Delta L=0.3$ inches and log at a tool speed of 60 feet per minute (fpm), then the sample rate $T_s$ is determined by equation 6:

$$T_S = \frac{60 \text{ fpm}}{\Delta L} = 40 \text{ sweeps/second}$$

Thus, 40 sweeps/second is the minimum desired sample rate to sample a complete sweep of the trace. It is desired to set this number higher, preferably 100 sweeps/second. If the length l of the transmission line is 5 inches and the transmission line is embedded within an insulator having a relative permittivity $\epsilon_r$ of 4, then the amount of time for the applied wave to travel the length of the transmission line, referred to as $\Delta T_{REAL}$, is determined by the following equation 7:

$$\Delta T_{REAL} = \frac{l\sqrt{\epsilon_r}}{C_o} = 0.833 \text{ ns}$$

Of course, $\Delta T_{REAL}$ would be modified by changes in the impedance along the transmission affecting the velocity of the electromagnetic wave. The value determined above, however, is good for determining the necessary number of samples/sweep at the desired time resolution as follows. The number of samples/sweep at a desired time resolution (TR) of 20 ps is determined by the following equation 8:

$$\frac{\Delta T_{REAL}}{TR} = 42 \frac{\text{samples}}{\text{sweep}}$$

Therefore, it is desired to have approximately 42 samples per sweep to measure to the end of a 5 inch transmission line at the desired time resolution TR of 20 ps. A time resolution TR of 20 ps gives a resolution along the transmission line as determined by the following equation 9:

V ($\Delta T_{REAL}$) 0.12 inches where V is the velocity of the applied voltage, which is $C_o$ divided by the square root of the relative permittivity $E_r$.

Figure 17:
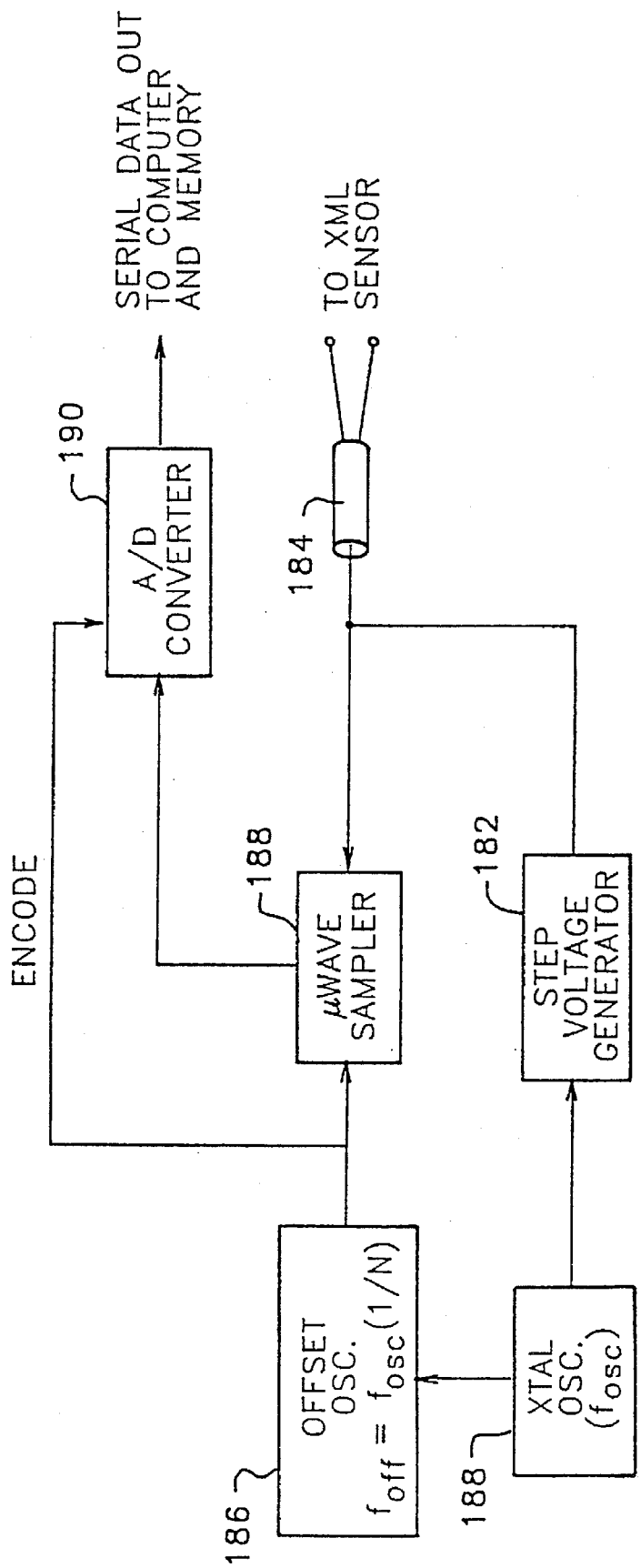
FIG. 17 is a block diagram of electrical apparatus for use with a time domain reflectometer apparatus according to the present invention.

Referring now to FIG. 17, a block diagram is shown of an electrical apparatus for use with a time domain reflectometer apparatus according to the present invention. It is noted that the signals being measured occur too quickly for conventional sampling equipment to sample the signals at the desired time resolution (TR), which is on the order of 20 ps. However, since the signals are repeatable, a sampling technique is employed similar to the sampling technique used by sampling oscilloscopes, where progressive samples of adjacent portions of successive waveforms are taken. Thus, the applied voltage is asserted repetitively, and a number of samples are measured for each repetition or sweep. In this manner, an adjacent sample is measured after the desired time resolution (TR).

A crystal oscillator 180 operates at a frequency $f_{OSC}$. The crystal oscillator 180 drives or triggers a step voltage generator 182, which provides a step voltage output to a transmission line sensor 184. The sensor 184 is coupled to a transmission line aligned along a borehole wall as described previously. The transmission line sensor 184 preferably includes detection, receiver and amplification circuitry for monitoring the reflections from the applied step voltage on the transmission line. A microwave sampler 188 receives the output of the sensor 184 and samples the reflections at a frequency of $f_{OFF}$, which is slightly different from the frequency $f_{OSC}$. The output of the crystal oscillator 180 is also applied to an offset oscillator 186, which generates the frequency $f_{OFF}$ according to the following equation 10:

$$f_{OFF} = f_{OSC}\left(1 - \frac{1}{N}\right)$$

This provides a sample at succeeding steps of the step voltage generator 182 at time differences as determined by the following equation 11:

$$\frac{1}{f_{OSC}\left(1 - \frac{1}{N}\right)} - \frac{1}{f_{OSC}} = \frac{1}{f_{OSC}(N-1)}$$

If the time resolution of 20 ps is desired, $Nf_{OSC}$ must be equal to $50\times10^9$, so that the samples repeat at a rate of about $f_{OSC}/N$. Thus, $N \approx f_{OSC}/100$, so that $(f_{OSC})^2 = 5\times10^{12}$. It follows that $f_{OSC}$ is approximately 2.2 MHz. This is the preferable frequency of operation of the sampler 188.

The microwave sampler 188 applies an output to an analog to digital (A/D) converter 190, which also receives the output of the offset oscillator 186. The A/D converter 190 provides serial data output, which can be retrieved and stored by a computer or otherwise displayed on a monitor. If the tool is operating at 100 sweeps/sec and at 42 words/sweep, and if each word is 8 bits, the data rate is about 33,600 bits per second (bps). The computer could also calculate the difference between the samples of the serial data output with corresponding digital signals representing the reflections measured in freespace. If each transmission line is properly terminated, such reflections in freespace would be minimal. From these differential values, the dielectric constant of the materials at corresponding points along the borehole can readily be calculated by the computer using the principles and equations discussed above. The computer can also retrieve data from respective electrical tap points for determining the average velocity of the electromagnetic wave on each transmission line as a correction factor and to allow a position indication of the dielectric constant values. Additionally, the velocity information can be used as a cross check on the dielectric constant, with the changes in the dielectric constant being used to correct the velocity profile from the average velocity to more specific values. Alternatively, the opposite end of each transmission line may be left open circuited or shorted, and the total round trip time of the original implied voltage and its reflection can be used to calculate the velocity. If the latter method is used, the speed of the tool in the borehole may need to be decreased to maintain the desired time resolution (TR).

It can now be appreciated that the principles disclosed herein may be used to devise a time domain electromagnetic well logging sensor for determining the dielectric constant of the materials along a borehole, which can be used with other measurements to determine the makeup of the borehole. The logging tool includes sensor pads or other similar apparatus for locating a plurality of transmission lines adjacent the borehole wall. The transmission lines may be placed at any angle relative to the center line of the borehole, but are preferably angled to overlap each other for a complete mapping. An impulse or step voltage is applied to one end of each transmission line, and the response is measured at the sending end. The measured reflections are used to calculate the location and relative magnitude of changes of dielectric constant of materials along the borehole wall by a computer or other similar means. The tool traverses the entire length of the borehole, or any part thereof, for the desired mapping of the borehole. Appropriate electronic circuitry applies the input step voltages and samples the response at the appropriate rate based on desired speed of the tool and the desired resolution of the mapping.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A time domain reflectometer logging tool for measuring the electrical characteristics of the materials along the wall of a borehole having a center axis, comprising:

plurality of transmission lines having first and second ends mounted at an angle with respect to the center axis of the borehole, wherein each transmission line covers an arcuate portion of the circumference of the borehole wall, wherein each arcuate portion covered by one transmission line overlaps arcuate portions covered by adjacent transmission lines, and wherein the entire cylindrical circumference of the borehole wall is covered by said plurality of transmission lines;

an apparatus for mounting and transporting said transmission lines adjacent to the borehole wall; and electrical circuitry coupled to the first end of each said transmission line, further comprising:

means for applying a voltage on said first end of each said transmission line, wherein said voltage establishes an electric field which interacts with the borehole wall;

means coupled to said first end of each said transmission line for detecting reflection signals on said transmission line over time in response to said voltage; and means coupled to said detecting means for determining the differential response between said reflection signals in response to said voltage when said transmission lines are adjacent the borehole wall and reflection signals in response to said voltage when said transmission lines are in free space.

2. The time domain reflectometer logging tool of claim 1, wherein said transmission line is approximately 5 inches in length.

3. The time domain reflectometer logging tool of claim 1, wherein said apparatus further includes;

a pad having a rounded face for mounting said transmission line; and means coupled to said pad for transporting said pad so that said rounded face of said pad is adjacent to, but not contacting the borehole wall.

4. The time domain reflectometer logging tool of claim 1, wherein said apparatus further includes means for transporting said apparatus through the length of the borehole.

5. The time domain reflectometer logging tool of claim 1, wherein said transmission line comprises two conductors aligned adjacent to each other and separated by a non-conducting slot, wherein said electrical circuitry applies said voltage between said two conductors at one end of said slot.

6. The time domain reflectometer logging tool of claim 1, wherein said determining means further comprises:

sampling means coupled to said detecting means for sampling said reflection signals at a predetermined rate and providing corresponding sampled signals; and an analog to digital converter for converting said corresponding sampled signals to corresponding digital signals.

7. The time domain reflectometer logging tool of claim 6, wherein said determining means includes memory coupled to said analog to digital converter for retrieving and storing said digital signals.

8. The time domain reflectometer logging tool of claim 6, wherein said determining means further comprises:

a computer coupled to said analog to digital converter for retrieving said digital signals and for calculating the difference between said digital signals and corresponding digital values representing said reflection signals measured in response to said voltage when said transmission line is in freespace.

9. The time domain reflectometer logging tool of claim 8, wherein said computer further calculates the dielectric constant of the materials along the borehole wall from the difference between said digital signals and said digital values.

10. The time domain reflectometer logging tool of claim 1, further comprising:

a sensor coupled to said first end of said transmission line and coupled to said electrical circuitry for receiving and asserting said voltage onto said transmission line, and for detecting and amplifying said reflection signals.

11. The time domain reflectometer logging tool of claim 10, wherein said electrical circuitry further comprises:

a first oscillator for generating a first frequency signal;

a step voltage generator coupled to said oscillator and said sensor for asserting said voltage at said first frequency;

an offset oscillator coupled to said first oscillator for generating an offset frequency, wherein the time differential between the respective periods of said first and offset frequencies is approximately equal to a desired time resolution for sampling said reflection signals; and a sampler coupled to said offset oscillator and said sensor for sampling said reflection signals at a rate corresponding to said offset frequency and for providing corresponding sampled signals.

12. The time domain reflectometer logging tool of claim 11, wherein said desired time resolution is approximately 20 picoseconds.

13. The time domain reflectometer logging tool of claim 11, further comprising:

an analog to digital converter coupled to said offset oscillator and said sampler for converting said corresponding sampled signals to corresponding digital signals.

14. The time domain reflectometer logging tool of claim 13, further comprising:

a computer coupled to said analog to digital converter for retrieving said digital signals and for calculating the difference between said digital signals and corresponding digital values representing said reflection signals measured in response to said voltage when said transmission line is in freespace.

15. A method of using a time domain reflectometer to measure the electrical properties of the materials in a borehole having a center axis, comprising the steps of:

placing a plurality of transmission lines in close proximity with the borehole wall at an angle with respect to the center axis, wherein each transmission line covers an arcuate portion of the borehole wall, wherein each arcuate portion covered by one transmission line overlaps the arcuate portion of adjacent transmission lines so that the entire cylindrical circumference of the borehole wall is covered by transmission lines;

applying a voltage to one end of the respective transmission lines, wherein the voltage establishes an electric field which interacts with the borehole wall; detecting reflection signals on the transmission lines as a function of time in response to the applied voltage; and determining the differential response between the reflection signals in response to the applied voltage in the borehole and reflection signals in response to the applied voltage when the transmission lines are in free space.

16. The method of claim 15, further comprising the step of transporting the transmission. line through the length of the borehole.

17. The method of claim 15, wherein said determining step further comprises the steps of:

sampling the reflection signals at a predetermined rate and providing sampled signals; and converting the sampled signals to corresponding digital signals.

18. The method of claim 17, after said converting step, further comprising the step of calculating the difference between the digital signals and corresponding digital values representing the reflection signals measured in response to the applied voltage when the transmission time is in freespace.

19. The method of claim 18, after said difference calculating step, further comprising the step of calculating the dielectric constant of the materials along the borehole wall from the calculated difference between the digital signals and values.

20. The method of claim 15, wherein said applying step further comprises the steps of repeatedly applying the voltage on the transmission line at a first frequency; and wherein said detecting step further comprises the step of sampling the reflection signals at a second frequency for providing sampled signals, wherein the time differential between the periods of the first and second frequencies is approximately equal to a desired time resolution for sampling the reflection signals measured in the borehole.

21. The method of claim 20, after said sampling step, further comprising the step of:

converting the sampled signals to corresponding digital signals.

22. The method of claim 21, after said converting step, further comprising the step of calculating the difference between the digital signals and corresponding digital values representing the reflection signal measured in response to the voltage when the transmission line is in freespace.

* * * * *